United States Patent
Leal

(10) Patent No.: US 10,184,565 B2
(45) Date of Patent: Jan. 22, 2019

(54) MECHANICAL END FACE SEAL HAVING AN INDUCTION HEATED SEAL FACE

(71) Applicant: John Crane Inc., Chicago, IL (US)

(72) Inventor: Antonio Raul Leal, Philadelphia, PA (US)

(73) Assignee: John Crane Inc., Chicago, IL (US)

( * ) Notice: Subject to any disclaimer, the term of this patent is extended or adjusted under 35 U.S.C. 154(b) by 0 days.

(21) Appl. No.: 15/413,337

(22) Filed: Jan. 23, 2017

(65) Prior Publication Data

US 2018/0209545 A1 Jul. 26, 2018

(51) Int. Cl.
| | |
|---|---|
| *F16J 15/32* | (2016.01) |
| *F16J 15/324* | (2016.01) |
| *F16J 15/3284* | (2016.01) |
| *H05B 6/10* | (2006.01) |
| *H05B 6/06* | (2006.01) |
| *F16J 15/34* | (2006.01) |

(52) U.S. Cl.
CPC ......... *F16J 15/324* (2013.01); *F16J 15/3284* (2013.01); *F16J 15/3404* (2013.01); *F16J 15/3492* (2013.01); *H05B 6/06* (2013.01); *H05B 6/10* (2013.01)

(58) Field of Classification Search
CPC ........ F16J 15/324; F16J 15/3284; H05B 6/06; H05B 6/10
See application file for complete search history.

(56) References Cited

U.S. PATENT DOCUMENTS

| | | | |
|---|---|---|---|
| 2,257,011 | A | 9/1941 | Hillier |
| 3,467,396 | A | 9/1969 | Hershey |
| 4,872,689 | A | 10/1989 | Drumm |
| 5,718,560 | A | 2/1998 | Lorenzen |

(Continued)

FOREIGN PATENT DOCUMENTS

| | | |
|---|---|---|
| CN | 203321897 U | 12/2013 |
| EP | 0335497 B1 | 4/1993 |

(Continued)

OTHER PUBLICATIONS

American Petroleum Institute, API Standard 682 4th Edition, "PumpsShaft Sealing Systems for Centrifugal and Rotary Pumps", May 2014, 268 pages.

(Continued)

*Primary Examiner* — Gilbert Y Lee
(74) *Attorney, Agent, or Firm* — Patterson Thuente Pedersen, P.A.

(57) ABSTRACT

A mechanical end face seal having an induction heated seal ring is provided to be used for sealing high-viscosity thermo-sensitive fluids in pressure containing rotating equipment. The different embodiments particularly provide a sealing member fixed to the housing, the sealing element is constructed using ferromagnetic materials. An induction coil attached to a power source is installed outside the housing, said induction coil is supplied with an alternating current producing a time dependent magnetic field that induces eddy currents in the aforementioned sealing member generating heat thus affecting the operating temperatures of the sealing member and hence the interface temperature to achieve greater sealing efficiency, longer seal life and faster equipment startup.

20 Claims, 6 Drawing Sheets

(56) References Cited

U.S. PATENT DOCUMENTS

| 9,138,805 | B2 | | 9/2015 | Wodrich | |
|---|---|---|---|---|---|
| 2007/0267820 | A1 | * | 11/2007 | Martin | F16J 15/3496 |
| | | | | | 277/404 |
| 2008/0047756 | A1 | | 2/2008 | Hooper | |
| 2013/0259679 | A1 | * | 10/2013 | Brailean | F16J 15/008 |
| | | | | | 415/230 |
| 2015/0377362 | A1 | * | 12/2015 | Lin | F16C 33/746 |
| | | | | | 277/410 |

FOREIGN PATENT DOCUMENTS

| JP | 2011-185326 A | 9/2011 |
|---|---|---|
| WO | WO 2009-022134 A1 | 2/2009 |

OTHER PUBLICATIONS

IMechE Guides for Process Industries, "Mechanical Seal Practice for Improved Performance", 1992, 32 pages.
Search Report and Written Opinion dated Jun. 15, 2018 for PCT Application No. PCT/US2018/014455, 13 pages.

* cited by examiner

*PRIOR ART*

PRIOR ART

MECHANICAL END FACE SEAL HAVING AN INDUCTION HEATED SEAL FACE

TECHNICAL FIELD

The present invention relates to a mechanical end face seals and more specific to such seals used in devices for containing fluids under pressure, more particularly relates to a mechanical seal to be used for sealing high-viscosity thermo-sensitive fluids, which requires less pre-heating time and with lower power consumption.

BACKGROUND

Prior Art

The following tabulation is a tabulation of some prior art that presently appears relevant:

U.S. PATENTS

| Pat. No. | Kind Code | Issue Date | Patentee |
|---|---|---|---|
| 4,872,689 | A | 1989 Oct. 10 | Drumm |
| 2,257,011 | A | 1941 Sep. 23 | Hillier |
| 3,467,396 | A | 1967 May 10 | Hershey |
| 9,138,805 | B2 | 2015 Sep. 22 | Wodrich |

FOREIGN PATENT DOCUMENTS

| Foreign Doc. Nr. | Cntry Code | Kind Code | Pub. Dt | App or Patentee |
|---|---|---|---|---|
| CN203321897U | CN | C14 | 2014 Dec. 10 | 川源(中国)机械有限公司 |

NON-PATENT LITERATURE DOCUMENTS

American Petroleum Institute, API Standard 682 4Th Edition, "Pumps—Shaft Sealing Systems for Centrifugal and Rotary Pumps" (May 2014).
IMechE Guides for the Process Industries, "Mechanical Seal Practice For Improved Performance" (1992).

BACKGROUND OF THE INVENTION

The present invention relates to a mechanical end face seals and more specific to such seals used in devices for containing fluids under pressure, more particularly relates to a mechanical seal to be used for sealing high-viscosity thermo-sensitive fluids and in particular for heating devices for use in combination of such seals.

Mechanical end face seals, are critical components of pressure containing devices in many industries, today they are the predominant seal type found in pumps, compressors and similar equipment. In terms of sealing efficiency, durability, versatility and maintenance costs, they represent a significant improvement over other sealing techniques such as gland packing, sealing rings and radial seals.

These type of seals are designed with a great deal of care and attention to different parameters such as the materials, shapes, heat balance, tolerances and power consumption among others. Such level of detail is necessary to ensure its efficient operation over a period of years without the need of maintenance.

Mechanical seals in principle, consist of two flat faces arranged perpendicular to the axis of a rotating shaft. One face is fixed to the pressure holding device casing or vessel and the other is fixed to the shaft rotating with it. In order to keep frictional heat generation and wear within acceptable limits, a lubricating film of liquid must be maintained between the seal faces. In most cases when single seals are employed, this lubricant film is comprised by the sealing fluid.

For single mechanical seals, which seal devices containing highly viscous thermo-sensitive liquids such as oils, petroleum derivatives and syrups, the viscosity of this lubricating film can be excessive causing damage to the faces and producing undesirable leakage of the sealing fluid to the atmosphere as the viscosity of the lubricating film is directly proportional to the shearing forces exerted to the sealing faces materials. Said statement can be evidenced in the in the governing equation to determine the magnitude of the force produced by the viscous shear of the lubricating film:

$$F = \frac{\eta \times V \times A}{h}$$

Wherein $\eta$ is the dynamic viscosity of the sealed fluid, V is the relative sliding velocity between the rotating seal ring and the stationary seal ring, A is the sealing face annular area and h is the lubricating film thickness.

Conventional approaches addressing the high viscosity problem consist in providing heating to assist in increasing the temperature in the seal chamber through heat jackets 51 built in the pump casing as indicated in FIG. 1. Said jackets are injected with high temperature steam or other suitable heating media to increase the temperature in the sealing chamber, this causes heating to the fluid inside it and consequently heating the mechanical seal faces and hence the sealing interface. This arrangement have a number of disadvantages. When considering the energy required, one must have to heat the whole casing and the fluid inside it to produce an effect on the seal, this requires a great amount of heat and is consequently not very efficient and cost-effective. Additionally, said jackets are prone to fouling and shall be used only with great care.

Another method involves the use of jacketed seal glands 52 as indicated in FIG. 2. Again, this method requires the injection of a heating media to said jackets, in this case the seal interface is heated by means of conduction through the gland, then to the secondary seal and then to the stationary sealing face. This is also a very ineffective method as the heat has to cross a lengthy path to produce any effect to the sealing interface. Additionally, the heating media normally has to be transported from the location of the generation such as boilers or furnaces to the location of the equipment normally using long pipes which results in lots of the energy is lost to the atmosphere.

Another approach is to wrap the pump casing with a resistance heaters, this shares the same disadvantages of the aforementioned methods and the only change is that instead of using an external fluid, it uses electrical energy for heating. Whether the resistance heaters are installed outside the stuffing box or the seal gland, this method also produces a lengthy heat transfer path from the resistance to the seal faces to produce any effect.

Another method has been proposed by Drumm and is the subject of the U.S. Pat. No. 4,792,416 which involves the use of an annular heat exchanger which, in use, surrounds the sealing faces producing an annular zone of fluid pressure between the heat exchanger and the sealing members. The heat exchanger acts to transmit heat energy into or out of the above-noted annular zone thereby to affect the temperature of the fluid in such zone during use and hence affect the operating temperatures of the sealing members and the interface temperature with the intention of achieving the most efficient operating temperature for the application. Although an improvement from the previous methods, this one still depends on indirect heating to heat the seal faces and hence the interface.

Additionally to the disadvantages expounded in each of the methods described above, there are two major drawbacks that are shared by them all. First, as the heat energy is transferred indirectly to the sealing faces, it takes longer to reach the optimum operating temperature, often delaying startups or causing cold starts that lead to face fractures as the high viscosity of the sealing interface is translated in high starting torques and stresses above the material resistance limit. Second, these methods don't have provisions to control the heat energy transmitted to the faces which results in the seals operating at temperatures out of the most efficient point. Additional advantages of the present invention will become readily apparent to those skilled in this art from the following detailed description.

As can be seen from the explained above, there is a need for a method to produce heat directly in the sealing faces hence reducing the heat transfer path to the interface in order to achieve better efficiency, more reliability and faster equipment availability.

SUMMARY OF THE EMBODIMENTS

Accordingly, there is provided herein a mechanical seal for sealing fluids under pressure between a housing and a relatively rotating shaft extending through a bore in the housing, wherein the mechanical seal has a pair of annular sealing members. Each of these annular members typically includes a radially arranged annular sealing surface with these sealing surfaces being in face-to-face sealing proximity with one another during use so as to define a radially arranged annular sealing interface which separates a region of higher pressure from a region of lower fluid pressure. One of the sealing members is fixed with respect to the housing whereas the other sealing member is positioned on one side of the sealing member thus forming the aforementioned annular sealing interface and capable of rotation in response to the rotation of the sealing shaft.

In a preferred embodiment, the sealing member fixed to the housing is constructed of a ferromagnetic material. An induction coil attached to a power source is installed outside the housing, said induction coil is supplied with an alternating current producing a time dependent magnetic field that induces eddy currents in the aforementioned sealing member generating heat thus affecting the operating temperatures of the sealing member and hence interface temperature to achieve greater sealing efficiency and/or longer seal life.

In a typical embodiment, the sealing member fixed to the housing may be comprised of more than one material being one of these of ferromagnetic nature.

DETAILED DESCRIPTION OF SPECIFIC EMBODIMENTS

The features of this invention are intended to be used in seals single arrangement. For the most part, the other elements of the seals arrangement are considered similar to those elements of a conventional contacting seal. Accordingly, the description of those seal elements not directly incorporating features of the invention will not be discussed in great detail. Such description is not required for practice of this invention, which may be applicable to a wide range of seal configurations known to practitioners of the seal industry. Only the substantive differences, which implicate inventive features of the seal embodiments will be discusses below in detail.

Figure 3:
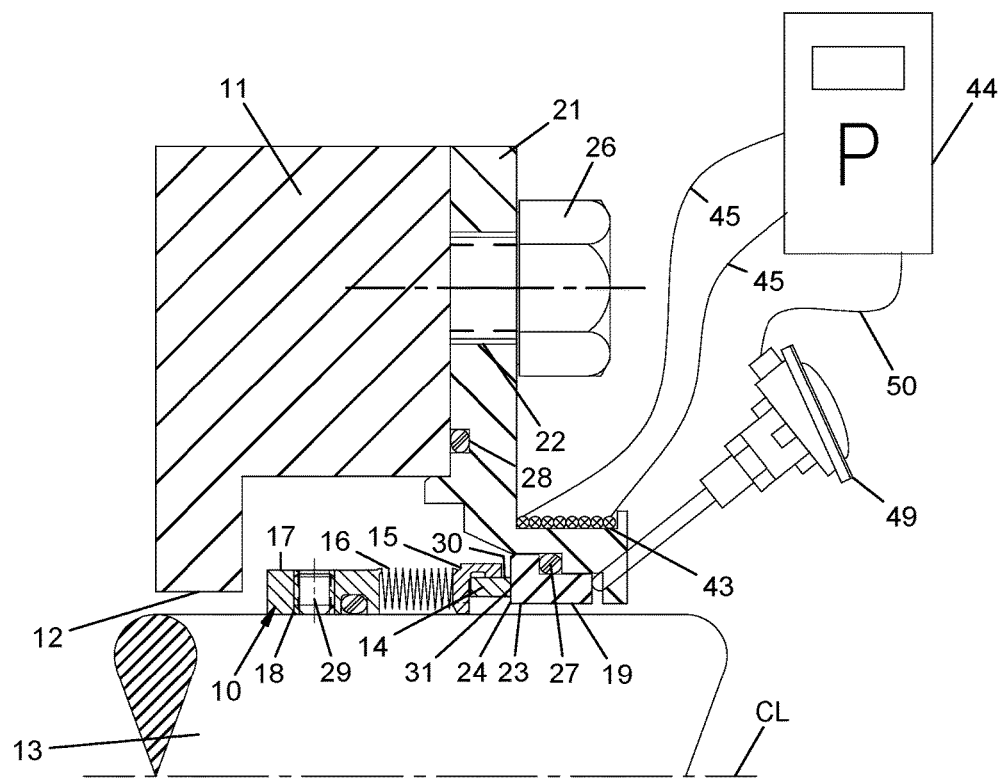
FIG. 3 is a cross-sectional view of an embodiment of the mechanical end face seal having an induction heated seal face according to the present invention using a cylindrical-shaped induction coil.

Referring now to the drawing FIG. 3, there is shown a housing 11, which may for illustration here be taken for the housing of the centrifugal pump, progressive cavity pump, mixer or generally similar equipment having an opening 12 through which extends a rotatable shaft 13.

The mechanical seal 10 comprises a nonrotating sealing member 19 which surrounds the shaft 13. The nonrotating sealing member 19 has an annular axial projection 23 which is provided with an accurately finished radial seal surface 24.

In the illustrated embodiment of the invention in the FIG. 3, the nonrotating sealing member 19 which may also be referred to as mating ring 19, is a gland insert which is mounted on a gland 21. The gland 21 is furthermore provided with a plurality of bolt holes 22. Bolts 26 may be passed through these bolt holes thereby to firmly secure the gland 31 to the housing 11, and suitable sealing means 27 and 28 such as o-rings are provided between the annular element 19 and the gland 21 and the housing 11.

The opposing rotating seal ring assembly comprises a seal ring 14 which surrounds the shaft 13. This seal ring is mounted in known fashion in an annular metal ring holder 15. This latter metal ring 14 in turn is coupled through a metal bellows 16 to a mounting collar 17. The mounting collar 17 has a plurality of threaded holes 18. Setscrews 29 may be passed through these threaded holes thereby to firmly secure the mounting collar 17 to the shaft 13.

The rotating sealing member 14 has an annular axial projection 30 which is provided with an accurately finished radial seal surface 31. The radial accurately finished surface 31 of the rotating sealing element 14 is urged against the accurately finished radial surface 24 of the nonrotating element 19 by means of the metal bellows 16 to form a seal therebetween. Both the rotating sealing element 14 and the nonrotating sealing element 19 serve to separate a region of higher fluid pressure from a region of lower fluid pressure.

It will be recognized by practitioners of the seal industry that all of the foregoing-described seal structure is conventional and may be varied within the scope of the invention. It is set forth here in some detail solely for background purposes and to insure a complete understanding of the following-described portion thereof wherein the substance of the invention is embodied.

A helically-wound cylindrical-shaped induction coil 43 is secured to the gland 21 by any convenient means like epoxy glue in accordance to the teachings of the present invention. The coil 43 may located concentrically and directly above of the mating ring 19 although in other embodiments may be located behind the mating ring 19 as shown schematically in FIG. 4. Referring again to FIG. 1, conducting cables 45 further connect the induction coil 43 to a power source 44 with means for controlling the power. The power source 44 supplies an alternating high frequency current to the induction coil 43 to produce a time dependent magnetic field that induces eddy currents in the nonrotating sealing member 19 which becomes hot via Joule heating mechanism. Heat generated in the nonrotating sealing element 19 is rapidly conducted to the rotating sealing element 14 thereby affecting the temperature of the sealing interface.

Figure 4:
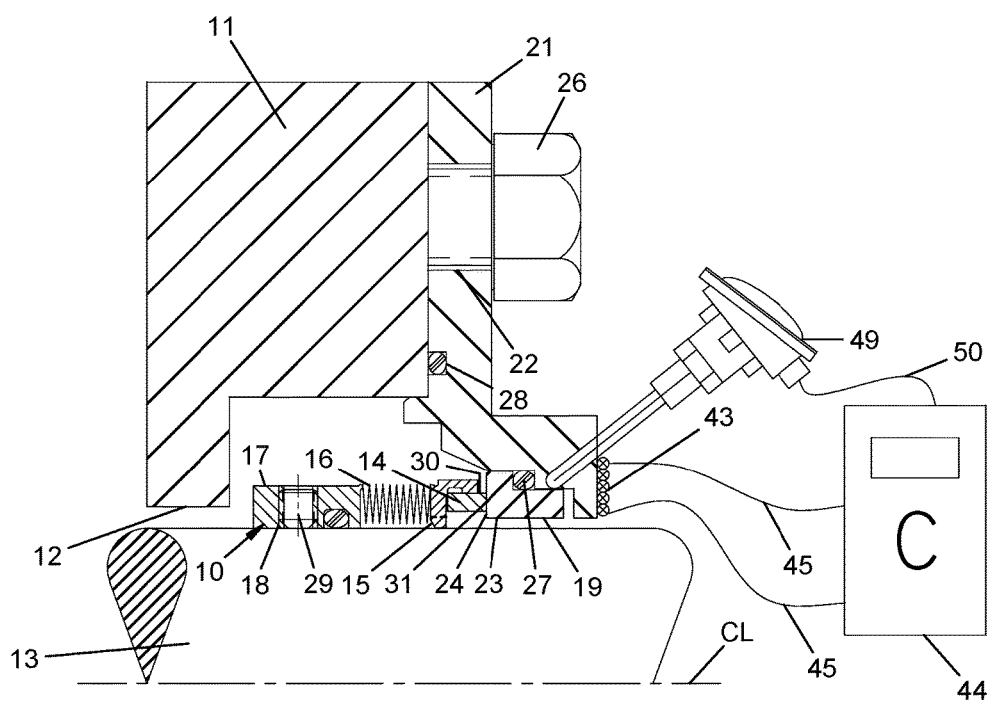
FIG. 4 is a cross-sectional view of an embodiment of the mechanical end face seal having an induction heated seal face according to the present invention using a pancake-shaped induction coil.

In the embodiments of FIG. 3 and FIG. 4; the rotating sealing member 19 may be fabricated of iron, stainless steel, titanium, alloys of these metals or other magnetically susceptible metal material capable of being inductively heated. The rotating sealing element 14 may be manufactured of a softer material like carbon graphite.

Figure 5:
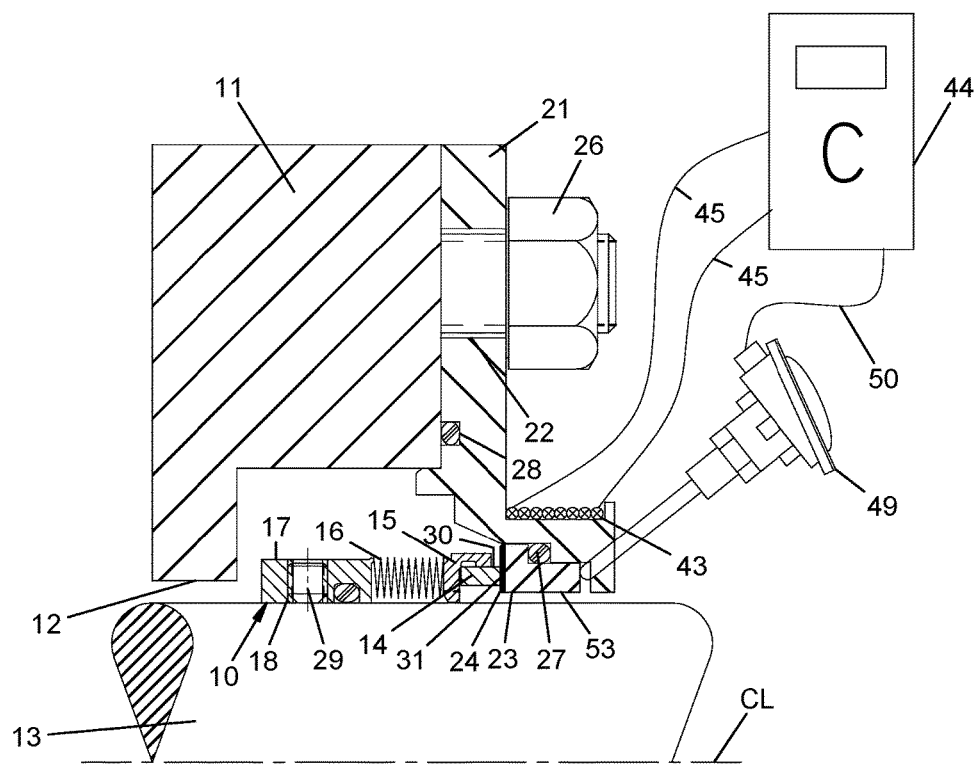
FIG. 5 is a cross-sectional view of an embodiment of the mechanical end face seal having an induction heated seal face with a hard coating according to the present invention using a cylindrical-shaped induction coil.

The seal construction 10 of FIG. 5, shows an embodiment wherein the highly polished surface 24 is manufactured on a high-hardness abrasion resistant coating that is metallurgically bonded to the base portion of the non-rotating sealing member 53. As taught therein the U.S. Pat. No. 9,138,805 B2, coating a metal surface with another metal or metal alloy to enhance appearance, protect against corrosion, or improve resistance to wear is often referred to as "hardfacing" or "hard surfacing". Such a coating allows for the use of lower cost materials as the base material of the mating ring 53, decreasing the overall cost of the seal. As in the aforementioned embodiments, the rotating sealing element 14 may be manufactured of a softer material like carbon graphite.

Figure 6:
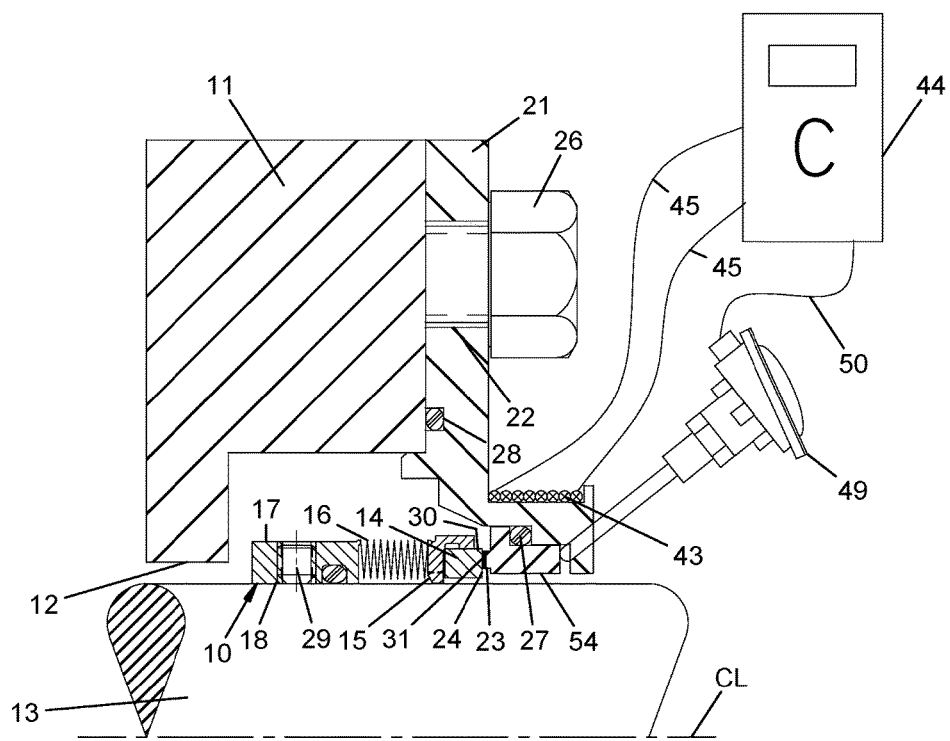
FIG. 6 is a cross-sectional view of an embodiment of the mechanical end face seal having an induction heated seal face with a hard coating and a narrower sealing face according to the present invention using a cylindrical-shaped induction coil.

Referring now to FIG. 6, therein illustrated is another cross-sectional view of an embodiment of the present invention wherein the highly polished surface 24 is manufactured on a high-hardness abrasion resistant coating that is metallurgically bonded to the base portion of the non-rotating sealing member 54 and the rotating sealing element 14 is manufactured of a material harder than the one used for the polished surface 24 like Silicon Carbide. The advantage of this embodiment it that it allows the use of two hard faces in opposition to the previously explicated embodiments, said combination is preferred in more demanding applications like for example asphalt or abrasive-laden fluids.

In all of the foregoing-described embodiments within FIG. 3 through FIG. 6, the gland 21 may be manufactured from a low loss metal like aluminum, copper or austenitic stainless steel so in this manner it won't be heated significantly by the inductive heating coils.

There are multiple advantages of this invention that may be derived from its use, one of these advantages is the fact that the heat is generated directly in the face therefore the increase of temperature of the sealing interface is instantaneous without the need to heat the surrounding media as required by the current state of technology, this represents is an improvement in power consumption and equipment availability Another advantage of the present invention is that it provides means to control the temperature of the sealing face which results in higher efficiency as the interface can be heated to the optimal operational temperature for the sealing fluid resulting again in improved efficiency over the conventional approach.

Still another advantage over the current methods can further be seen when compared to steam heated equipment. Normally in the industry the steam is generated in centralized locations like boilers or furnaces from where it is distributed to the operational locations through pipes. Oftentimes the heat is dissipated to the atmosphere producing important energy losses and inefficiencies. The present invention provides means to generate heat in place representing a more advantageous and effective method to heat the sealing interface.

Although some particular embodiments of the invention have been hereinabove described in detail for illustrative purposes, it will be recognized that obvious or equivalent variations or modifications of such disclosure are fully contemplated.

Operation

Figure 1:
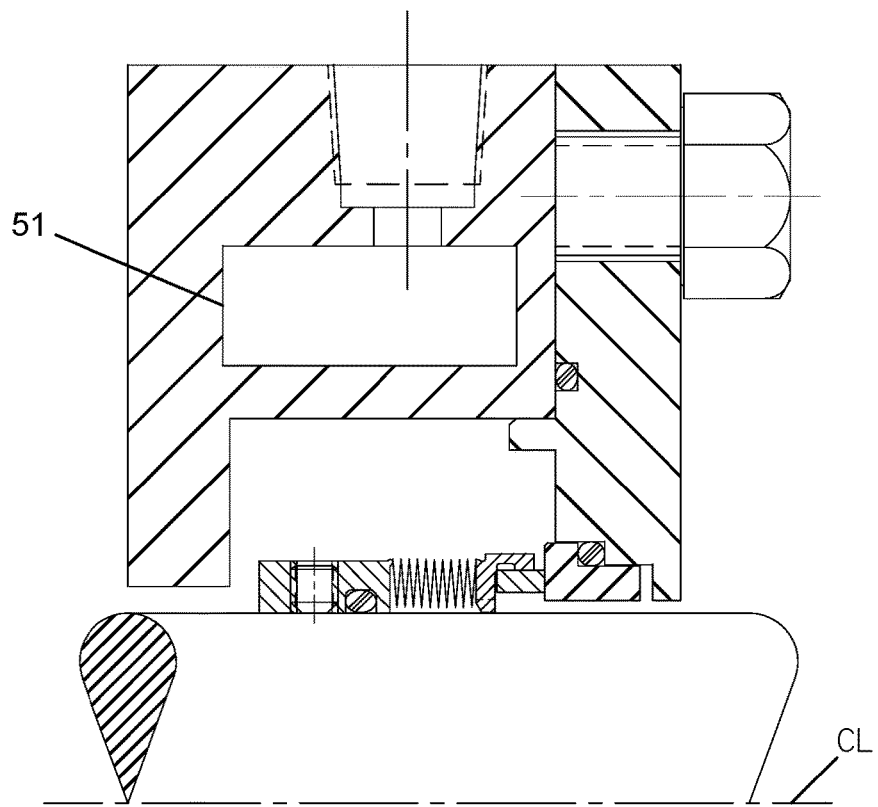
FIG. 1 shows the cross-sectional view of the prior art wherein the heat jacket is located on the pump casing
Figure 2:
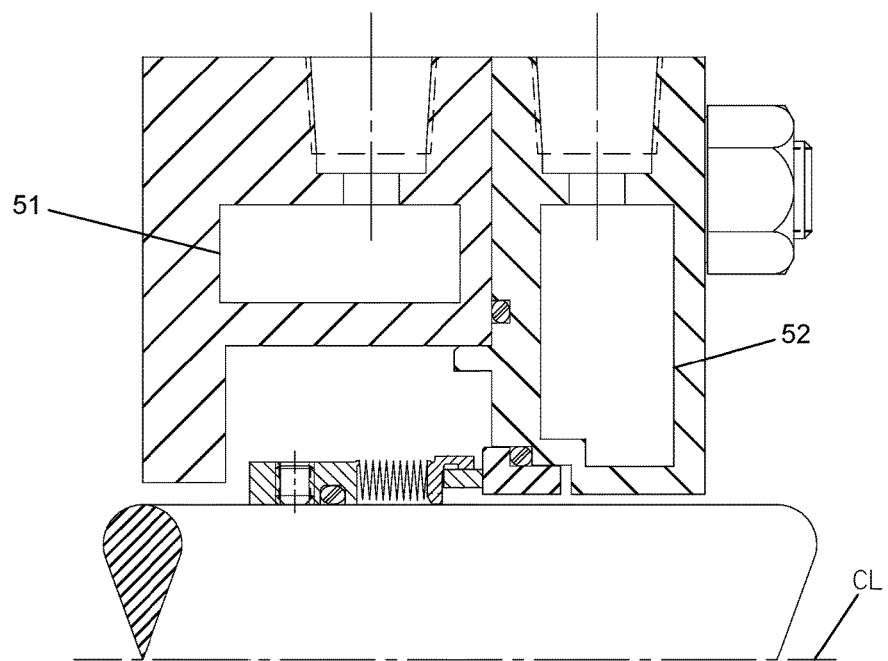
FIG. 2 shows the cross-sectional view of the prior art wherein the heat jackets are located on the pump casing and the seal gland.

The operation of the present invention is intended to be automated. Referring now to FIG. 1, in order to control the temperature of operation of the rotating sealing members 14 and the non-rotating sealing element 19, a thermocouple 49 or a related sensing device is provided, the same being placed in direct contact with the outermost section of the sealing member 19. The thermocouple 49 the senses the surface temperature of the nonrotating sealing member 19 and sends that information via wires 50 to the power source 44 to maintain the most appropriate sealing interface temperature in order to achieve greater sealing efficiency and/or longer seal life. The operational temperature is preset in the power source 44 based on calculations particular to every application and sealing fluid.

Although the operational procedure expounded in the previous paragraph is referred to the embodiment in FIG. 3, it also applies to the embodiments presented in FIG. 4, FIG. 5. And FIG. 6. No effort is made in this specification to further describe the control means in interest of brevity.

What is claimed is:
1. An induction heated mechanical seal system configured to decrease the viscosity of sealing fluid therein, the mechanical seal system comprising:
  a mechanical seal installed between a stationary housing and a rotatable shaft, the mechanical seal including a non-rotating sealing element operably coupled to the stationary housing, and a rotating sealing element operably coupled to the rotatable shaft, wherein the non-rotating sealing element and rotating sealing element respectively define opposed radial seal surfaces of a sealing interface adapted for acceptance a lubricating film of the sealing fluid therein;
  an inductive coil operably coupled to the stationary housing, the inductive coil configured to produce a magnetic field sufficient to induce eddy currents in at least a portion of the non-rotating sealing element, thereby increasing the temperature of the non-rotating sealing element and adjacent sealing interface, to decrease the viscosity of the sealing fluid.

2. The mechanical seal system of claim 1, wherein the non-rotating sealing element is fabricated of a magnetically susceptible metal material capable of being inductively heated.

3. The mechanical seal system of claim 2, wherein the non-rotating sealing element is fabricated of iron, stainless steel, titanium, or an alloy thereof.

4. The mechanical seal system of claim 1, wherein the portion of the stationary housing in which the inductive coil is operably coupled is fabricated of a non-magnetically susceptible metal material to minimize inductive heating of the stationary housing.

5. The mechanical seal system of claim 4, wherein the portion of the stationary housing in which the inductive coil is operably coupled is fabricated of aluminum, copper, austenitic stainless steel, or an alloy thereof.

6. The mechanical seal system of claim 1, wherein the inductive coil at least partially surrounds a portion of the non-rotating sealing element.

7. The mechanical seal system of claim 1, wherein the inductive coil at least partially surrounds the rotatable shaft proximal to an end of the non-rotating sealing element opposite to the radial seal surface.

8. The mechanical seal system of claim 1, further comprising a power source configured to supply an alternating high-frequency current to the induction coil.

9. The mechanical seal system of claim 8, further comprising a sensing device configured to sense a temperature of the non-rotating sealing element.

10. The mechanical seal system of claim 9, further comprising a power source controller configured to adjust an output of the power source based on the sensed temperature by the sensing device, so as to maintain the non-rotating sealing element at a desired temperature.

11. The mechanical seal system of claim 1, wherein the radial seal surface of the non-rotating sealing element includes a high-hardness abrasion resistant coating metallurgically bonded to the non-rotating sealing element.

12. The mechanical seal system of claim 1, wherein the rotating sealing element is fabricated of carbon graphite.

13. The mechanical seal system of claim 1, wherein the radial seal surface of the rotating sealing element is fabricated of a material having a hardness harder than the radial seal surface of the non-rotating sealing element.

14. The mechanical seal system of claim 1, wherein the radial seal surface of the rotating sealing element is fabricated of silicon carbide.

15. A method of inductively heating a mechanical seal to decrease the viscosity of sealing fluid therein, the method comprising:
   providing a mechanical seal between a stationary housing and a rotatable shaft, the mechanical seal including a non-rotating sealing element and an inductive coil operably coupled to the stationary housing, and a rotating sealing element operably coupled to the rotatable shaft, wherein the non-rotating sealing element and rotating sealing element respectively define opposed radial seal surfaces of a sealing interface adapted for acceptance a lubricating film of the sealing fluid therein;
   applying an electrical current to the inductive coil to produce a magnetic field sufficient to induce eddy currents in at least a portion of the non-rotating sealing element, thereby increasing the temperature of the non-rotating sealing element and adjacent sealing interface, to decrease the viscosity of the sealing fluid.

16. The method of claim 15, wherein the non-rotating sealing element is fabricated of a magnetically susceptible metal material capable of being inductively heated.

17. The method of claim 15, wherein the inductive coil at least partially surrounds a portion of the non-rotating sealing element.

18. The method of claim 15, wherein the mechanical seal further includes a sensing device configured to sense a temperature of the non-rotating sealing element.

19. The method of claim 18, wherein the mechanical seal further includes a power source controller configured to adjust an output of the power source based on the sensed temperature by the sensing device, so as to maintain the non-rotating sealing element at a desired temperature.

20. The method of claim 15, wherein the radial seal surface of the non-rotating sealing element includes a high-hardness abrasion resistant coating metallurgically bonded to the non-rotating sealing element.

* * * * *

UNITED STATES PATENT AND TRADEMARK OFFICE
CERTIFICATE OF CORRECTION

PATENT NO. : 10,184,565 B2
APPLICATION NO. : 15/413337
DATED : January 22, 2019
INVENTOR(S) : Leal It is certified that error appears in the above-identified patent and that said Letters Patent is hereby corrected as shown below:

In the Claims

Claim 1, Column 6, Line 59:
After "acceptance" insert -- of --.

Signed and Sealed this
Sixteenth Day of April, 2019

Andrei Iancu
*Director of the United States Patent and Trademark Office*